Figure 1:
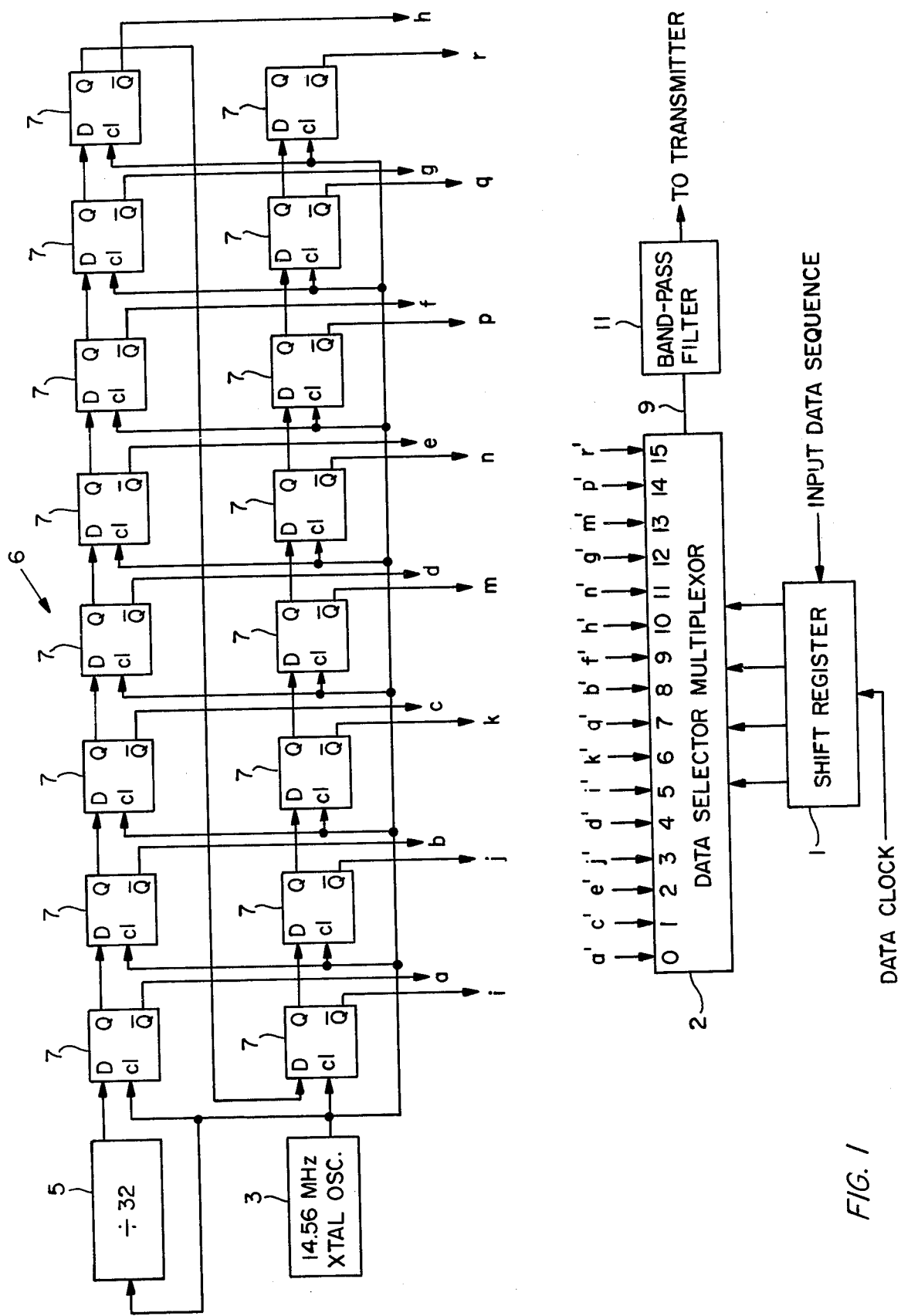

United States Patent [19]

Payne

[11] 4,079,202

[45] Mar. 14, 1978

[54] DIGITAL COMMUNICATION SYSTEM

[75] Inventor: Delmar Virgil Payne, Ferndale, Mich.

[73] Assignee: The Bendix Corporation, Southfield, Mich.

[21] Appl. No.: 731,142

[22] Filed: Oct. 12, 1976

[51] Int. Cl.² .............................................. H04J 3/18
[52] U.S. Cl. ........................... 179/15 BW; 179/15 BC
[58] Field of Search .................... 179/15 BC, 15 BW; 178/67

[56] References Cited

U.S. PATENT DOCUMENTS

| 3,720,789 | 3/1973 | Clark | 179/15 BC |
| 3,821,481 | 6/1974 | Melvin | 178/67 |
| 3,969,674 | 7/1976 | Tracey | 179/15 BC |
| 3,983,485 | 9/1976 | Stuart | 178/67 |

Primary Examiner—David L. Stewart
Attorney, Agent, or Firm—James R. Ignatowski; Russel C. Wells

[57] ABSTRACT

A signal system for use in a communication system for reducing intersymbol interference to increase the data rate per cycle of bandwidth, comprising a plurality of digital channel signal states each representing a channel symbol having a plurality of bits, the channel signal states being related in accordance with the simultaneous solution of a number of equations which are the first derivatives of mean squared channel error with respect to each signal state, each equation being set equal to zero and the equations being solved simultaneously to provide the related signal states.

5 Claims, 5 Drawing Figures

DIGITAL COMMUNICATION SYSTEM

The invention relates to communication systems and more particularly to the transmission of digital data.

PRIOR ART

Digital communication systems in their simplest form comprise two modems connected by a communication channel. The data rate of present modem design is limited by intersymbol interference which is a major source of error rather than random noise. The maximum data rate of a contemporary modem is approximately three bits per cycle of bandwidth.

Intersymbol interference reduces the accuracy of converting received channel signals to channel symbols because of amplitude or phase distortion during transmission. With rapidly increasing digital communication traffic and little possibility for a corresponding increase in spectrum allocation, more efficient use of channel bandwidth is imperative.

SUMMARY OF THE INVENTION

The present invention relates to a digital communication system for reducing intersymbol interference to increase the data rate per cycle of bandwidth. The invention includes a novel digital signal system modeled on the amplitude response of an ideal channel to a binary sequence.

A measure of intersymbol interference is the mean or expected value of squared channel error for an ideal band limited channel, that is, the part of the channel input power spectrum with frequency outside the channel pass-band. The mean squared error $\epsilon^2$ is expressed as follows:

$$\epsilon^2 = T \sum_{n=1}^{m} nD(n) \left\{ 1 + \frac{2}{\pi} \left[ \frac{1 - \cos(n\omega_c T)}{n\omega_c T} - Si(n\omega_c T) \right] \right\} \quad (1)$$

where T is a period during which the modulated signal parameter, amplitude in this description, is constant; $\omega_c$ is the equivalent channel baseband cut-off frequency; $Si(n\omega_c T)$ is the sine integral with argument $(n\omega_c T)$; $D(n)$ is the second-order difference equation of the piecewise continuous channel input signal correlation function. $D(n)$ is the coefficient of the Dirac delta function representing the infinite discontinuity of the second derivative of the autocorrelation function of channel input signal at integral multiples of period T; $m$ is the smallest number of periods between statistically independent samples of channel input signal. Equation (1) is derived by use of a well-known time differentiation relation from Fourier transform theory. The power spectrum of channel input signal is, by the well-known Wiener-Kinchine relation, the Fourier transform of the correlation function.

The autocorrelation function of channel input signals $x(t)$ and $x(t - nT)$ is the expected value of their product $$R_{xx}(nT) = E\{x(t) x(t - nT)\} \quad (2)$$

Since the channel input signals are real, the correlation function is real and even. If the probability of channel input signal amplitude, phase or frequency during a only a finite number of values of modulated signal parameter during the previous period, then, because only a finite number of values of mpodulated signal parameter are available in digital communications, the channel input signal may be modeled by a finite Markov chain. The correlation function is $$R_{xx}(nT) = \sum_i \sum_j P^{(n)}(\vec{x_j} \mid \vec{x_i}) P(x_i)(\vec{x_i} \cdot \vec{x_j}) \quad (3)$$

where $P^{(n)}\{x_j|x_i\}$ is the probability of signal state vector $x_j$ after $n$ transitions or periods given initial state vector $x_i$; $P(x_i)$ is the probability of initial state $x_i$; $x_i\cdot x_j$ is the scaler product of these vectors; $i, j = 1, 2, \ldots 2^m$ possible signal states; $n = 0, 1, 2, \ldots$ Conditional probability $P^{(n)}(x_j|x_i)$ is the element $t_{ij}^{(n)}$ of the $i$'th row and $j$'th column of the $n$'th power of the matrix of transition probabilities [T], which describe the Markov process. Given a set [X] of signal states with equal initial probability, it is seen that $$R_{xx}(nT) = \frac{1}{2^m} [X]^t [T]^n [X]; n = 0, 1, 2, \ldots \quad (4)$$

where $[T]^0$ is defined to be the identity matrix [I]. The set [X] is a column of row vectors. If the channel input signal is amplitude modulated, each signal state may be represented by a single scalar element, and [X] is then a column of scalar elements, a column vector.

Since the value of the modulated signal parameter is constant during each period T the correlation function is piecewise continuous, and the first and second derivatives as usually defined do not exist at integral multiples of the period. The second order difference equation is the coefficient of the Dirac delta function representing the infinite discontinuity of the second derivative at $nT$. It is $$D(n) = \frac{R_{xx}[(n-1)T] - 2R_{xx}(nT) - R_{xx}[(n+1)T]}{T} \quad (5)$$

Equation (1) is used to find a table of correspondences between channel input signals and channel symbols for which mean squared channel error is minimum. The signal states are treated as variables. The mean squared error is minimized by differentiating equation (1) with respect to each signal state and the result is set equal to zero. The system of equations is then solved simultaneously for the relative signal amplitudes. Substitute equation (4) into equation (5) and the result into equation (1) to obtain $$\epsilon^2 = [X]^t [M] [X] \quad (6)$$

where matrix [M] is $$[M] = ([I] - 2[T] + [T^2]) \quad (7)$$

$$\sum_{n=1}^{m} n[T]^{n-1} \left\{ 1 + \frac{2}{\pi} \left[ \frac{1 - \cos(n\omega_c T)}{n\omega_c T} - Si(n\omega_c T) \right] \right\}$$

Differentiate quadratic equation (6) with respect to each of the elements of [X] and [X]$^t$, and set equal to zero. Find $$[X]^t [M] + [M] [X] = ([M]^t + [M]) [X] = 0 \quad (8)$$

Either all elements of [X] are zero, or $([M]^t + [M])$ is singular in which event some of the signal states may be arbitrarily chosen.

Matrix $([M]^t + [M])$ is a function of transition matrix $[T]$ whose elements are the conditional probabilities of each signal state given the one preceding. Each signal state or channel signal is identified unambiguously by its channel symbol, an $m$-bit word. Because of this unambiguous correspondence between channel input signals and channel symbols, the elements of $[T]$ are also the conditional probabilities of each channel symbol given any other preceding channel symbol. Data are transmitted at the rate of one bit each period T if, given some channel symbol or signal, the probabilities of only two of the $2^m$ channel symbols or channel signals selected next are nonzero. The Markov property assumed for the channel signal sequence is realized in the sequence of channel symbols and in the corresponding sequence of channel signals, and data are transmitted at the rate of one bit per period T if the channel symbol sequence is formed from the bit sequence of the digital data by partitioning that sequence into intersecting $m$-bit subsets. The sequence of $m$-bit channel symbols is formed from the bit sequence by selecting $m$ consecutive digits from the bit sequence. Each channel symbol or word is formed of $m-1$ digits from the preceding word and the next new digit from the bit sequence. If each bit in the bit sequence is statistically independent of every other bit in the sequence and if "ones" and "zeros" are equally probable then the conditional probability of each of the two most probable channel symbols is 0.5 and the $(2^m - 2)$ remaining conditional probabilities are zero. A $2^m \times 2^m$ matrix of channel symbol transition probabilities is constructed by assuming each of the $2^m$ channel symbols as a condition. This is also the matrix $[T]$ of the transition probabilities of channel input signals since each channel symbol is formally identified with one of the channel signals in a table of correspondences.

At least two of $(2^m)!$ difference correspondence tables result in sequences of channel input signals which exhibit minimum channel error. These are found by solving equation (8) for elements of $[X]$. In order to find a solution, assume that the extremes of channel symbols, those with digits all "one" or all "zero," correspond to signal extremes. Also, assume that the complementing symmetry of $m$-bit channel symbols is imaged by the signals to which they correspond. That is, if A is the deviation of signal amplitudes from the mean and this corresponds to symbol 11 . . . 01, the signal amplitude deviation $-A$ corresponds by complementary symbol 00 . . . 10. List the channel symbols in an order that preserves complementary symmetry. For later computational convenience, let symbols with digits all "one" and all "zero" occupy the first and last positions on the list. Assign in order indices 1 through $2^m$ to channel signals corresponding to the channel symbols. Next construct a matrix $[T]$ of transition probabilities for both symbols and signals so ordered. Table I, constructed for $m = 4$, is an example of channel symbol order and of the transition matrix. Assign arbitrary values 1 and $-1$ to $x_1$ and $x_{2^m}$, (channel signals with indexes 1 and $2^m$). Construct matrices $[P]$, $[S]$ and $[Q]$ in the equation $$[P][S] = [Q] \tag{9}$$

from elements of matrices $[M]$, $[M]^t$ and $[X]$ of equation (8) after first assuming a baseband cut-off frequency $\omega_c$ and bit period T, and formulating transition matrix $[T]$. Matrices $[X]$ and $[Q]$ are column matrices with $N = 2$ elements; $[S]$ is a $(N/2 - 1) \times 1$ column matrix; $[M]$ is a $N \times N$ square matrix and $[P]$ is a $N \times (N/2 - 1)$ rectangular matrix. The elements of these matrices are $$q_i = -(m_{i,1} + m_{1,i}) + (m_{i,N} + m_{N,i}); i = 1, 2, \ldots, N \tag{10}$$

$$s_i = x_{i+1}; i = 1, 2, \ldots, N/2 - 1 \tag{11}$$

$$p_{ij} = m_{i,j} + m_{j+1,i} + m_{i,N-j} + m_{N-j,i}; i = 1, 2, \ldots, N; j = 1, 2, \ldots, N/2 - 1 \tag{12}$$

That is, the elements of $[P]$, $[S]$ and $[Q]$ are constructed from elements of the other matrices by taking advantage of the symmetry that must exist for symbol-symbol and signal-signal transitions, and the definite value assigned to two of the elements of $[X]$. Solve for $[S]$ by pre-multiplying both sides of equation (9) by the pseudo-inverse of $[P]$. Find $$[S] = ([P]^t[P])^{-1}[P]^t[Q] \tag{13}$$

From equation (11), the symmetry of channel signals and the assignment $x_1 = 1$, find $$x_1 = 1; x_i = s_{i-1}$$

$$x_{N+1-i} = -s_{i-1}; x_N = -1 \tag{14}$$

where $i = 2, 3, \ldots, N/2$.

The error minimization technique is applied to the symbol-signal correspondence table and transition matrix of Table I with results shown in Table II. It is noted that some of the symbols have equal relative amplitude and that these symbols may be paired for mirror symmetry. For example, symbols 1110 and 0111 or symbols 1101 and 1011 may be so paired. The significance of equal relative signal amplitudes is that if corresponding symbols are interchanged while maintaining complementary symmetry, there is no change of mean squared channel transmission error. The mean squared errors of a few of the 16 factorial possible channel symbol-signal correspondences are evaluated in Table III. The correspondences evaluated are listed in Table IIIa. The four-bit channel symbols are ordered monotonically according to the phases of the corresponding channel signals. Phase modulation is assumed in the evaluation with the 16 channel signal phases separated by integral multiples of 11.25 deg. The channel errors of signal sequences resulting from the correspondences in Table IIIa were calculated for different assumed channel base bandwidths and are shown in Table IIIb. Two of the correspondences A and B, result from the solution of equation (8); the others C, D, E and F do not. Channel symbol-signal correspondences A and B are the result of minimizing channel error when amplitude modulation is assumed. They also produce minimum channel error when channel signals are phase modulated.

From examination of Table II and from signal symmetry considerations, it is evident that only eight of the more than $2 \cdot 10^{13}$ different symbol-signal correspondences offer minimum channel error. They are shown in Table IV in Columns A to H. The channel symbols are ordered, for example, by decreasing signal amplitude, phase or frequency. Four of these result from the equal relative amplitudes of pairs of signals whose symbols possess mirror symmetry. The remaining four symbol-signal correspondence tables are found by assuming the other possible monotonic ordering of channel indexes for which relative signal amplitudes are the negative of those in Table II. If none of the relative signal amplitudes are equal, there would be only two symbol-signal correspondence tables for which mean squared channel error is minimum: one for each of the monotonic orders of signal amplitude indexes.

Although the table of symbol-signal correspondence or signal code is derived from amplitude modulated signals, the signal code also encompasses phase or frequency modulated signals. In order to achieve minimum signal bandwidth and minimum channel error, channel signals are ordered in amplitude, phase or frequency and paired with channel symbols according to the solution of equation (8). For convenience of signal generation and ease of recognition at the channel output terminal, the amplitude, phase or frequency is held constant during a bit period and differs from the amplitude, phase or frequency of other signals in the set by an integral multiple of a constant increment of amplitude, phase or frequency.

The information contained in a signal modulated by an implementation of a symbol-signal correspondence which is a solution to equation (8) suffers minimal intersymbol interference after transmission over a narrow band channel because the transmitted signal is comparatively narrow band. Decoding a signal at the channel output terminal is the inverse of encoding for transmission. The received signal is quantized into one of $2^m$ class intervals and the corresponding channel symbol is (tentatively) identified. When there is no external noise, intersymbol interferences, bit rate synchronization error or state quantization error, channel symbols and their component binary digits may be identified without error. However, since error sources are invariably present, decoding is accomplished by a novel technique in accordance with the invention.

The procedure for identifying signal codes or channel symbol-signal correspondence tables which offer minimum mean squared channel error or minimum signal bandwidth is not limited to data transmission rates of one bit per period T. If another data transmission rate is required, the matrix of transition probabilities must reflect the freedom in selecting the next channel symbol.

For illustrative purposes, in the following discussion the number of bits in a channel symbol is selected as $m = 4$. Binary data comprising a message shown in Table Va are clocked at the bit rate into a four-bit shift register from the channel encoder. As data are shifted through the register, the input binary sequence is effectively partitioned into intersecting four-bit subsets as shown in Table Va. Three of the four binary digits remain in the register in shifted position following a clock pulse and the next bit in the sequence is shifted into the register to provide the next channel symbol. The digits in the input binary sequence are almost statistically independent, as is expected of source data which are processed for redundancy reduction and then encoded for error control, and the sequence of four-bit words in the shift register is a finite Markov chain whose matrix of transition probabilities is found in Table I.

The four-bit word in the shift register after each clock pulse is a channel symbol and is the address of one of sixteen different channel signals which is selected for transmission during the bit period by the implementation of the correspondence table shown in Table Vb which is the same as Table IV H and the reverse of Table III A. In general, one of sixteen previously generated signals which differ from one another in amplitudes, phase or frequency, is selected to modulate the carrier of a single sideband transmitter. An analog gate between the signal source and the transmitter is opened each period by a decoder/demultiplexer according to the address in the four-bit shift register. A somewhat simpler implementation of the modem (modulator-demodulator) is possible if information is transmitted by phase modulating a carrier. A digital subcarrier is delayed in time (phase) by a multibit shift register which provides different phase delays of the subcarrier at the input or output of each flip-flop in the shift register. The phase delay in degrees is the product of (1) 360 deg, (2) the number of flip-flops between the tap point and the first tap, and (3) the ratio of shift register clock period to the subcarrier period. A phase delayed subcarrier is selected for transmission by a data selector/multiplexer according to the channel symbol in the four-bit address register. The channel symbol-signal correspondence table is implemented in the illustrative embodiments by connecting each subcarrier shift register tap point to a particular data selector/multiplexer data input terminal in accordance with Table Vb.

The invention contemplates a signal system for use in a communication system for reducing intersymbol interference to increase the data rate per cycle of bandwidth, comprising a plurality of digital channel signal states each representing a channel symbol having a plurality of bits, the channel signal states being related in accordance with the simultaneous solution of a number of equations which are the first derivatives of mean squared channel error with respect to each signal state, each equation being set equal to zero and the equations being solved simultaneously to provide the related signal states.

DRAWINGS

Figure 2:
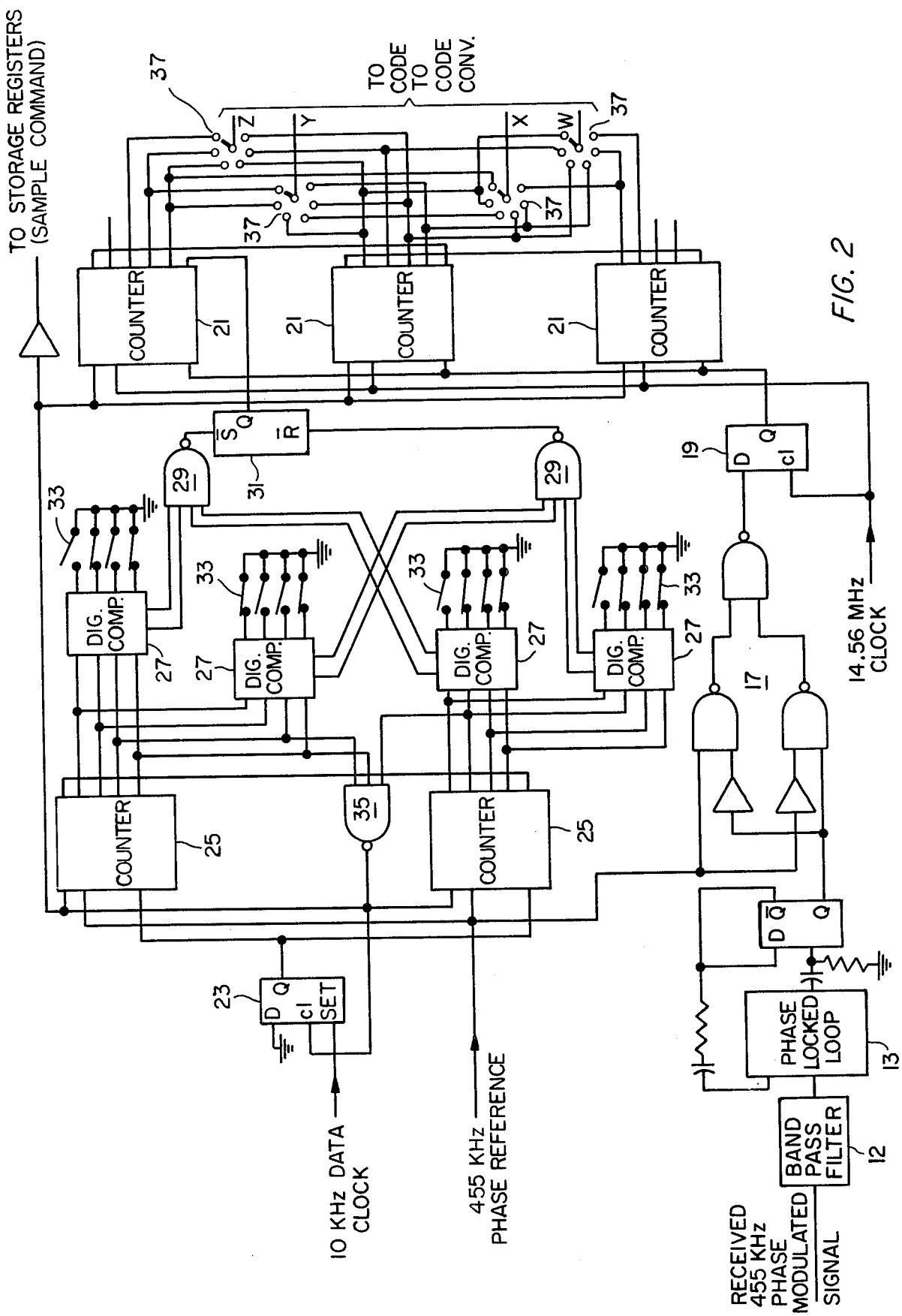
Figure 3:
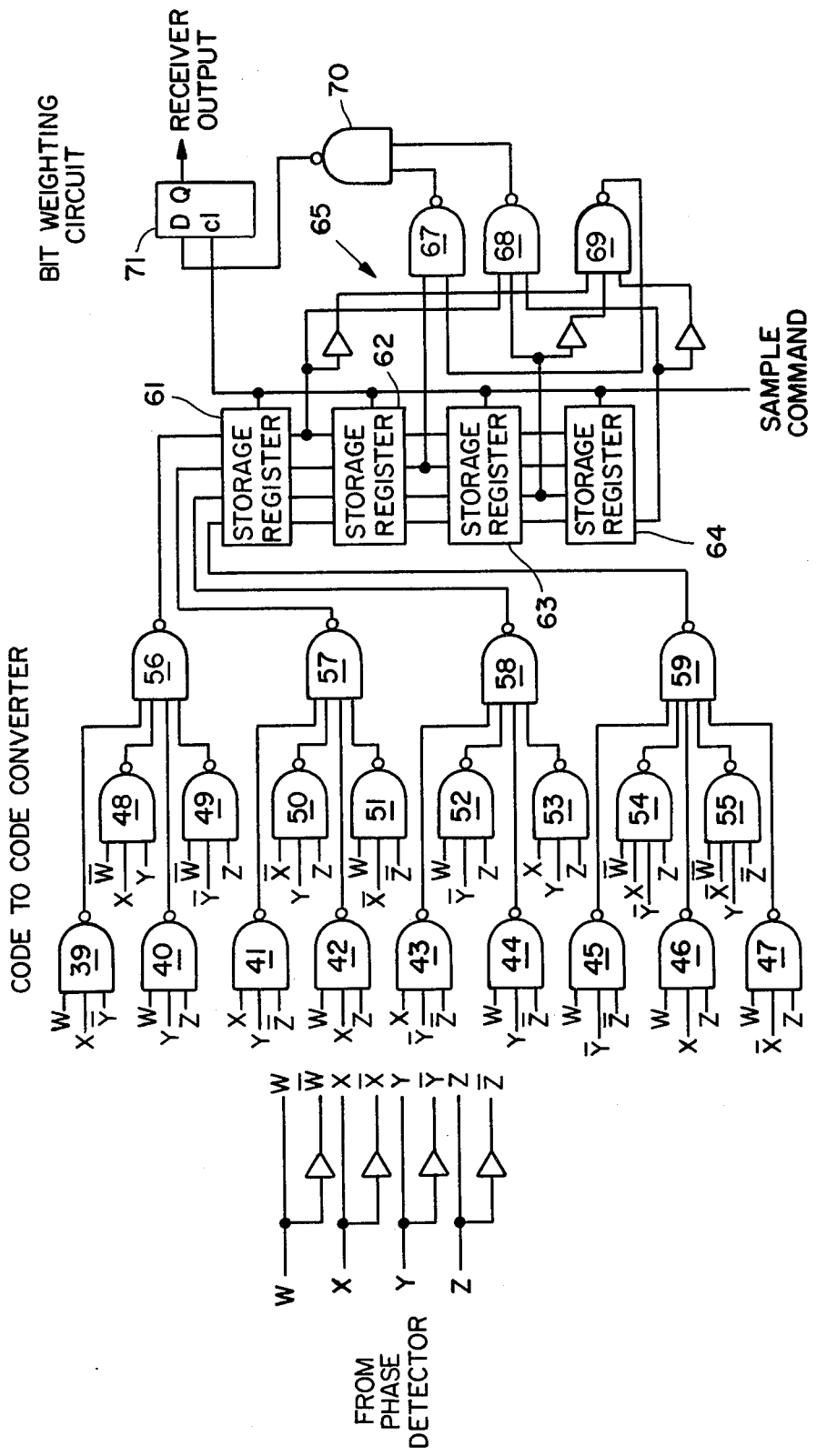
Figure 4:
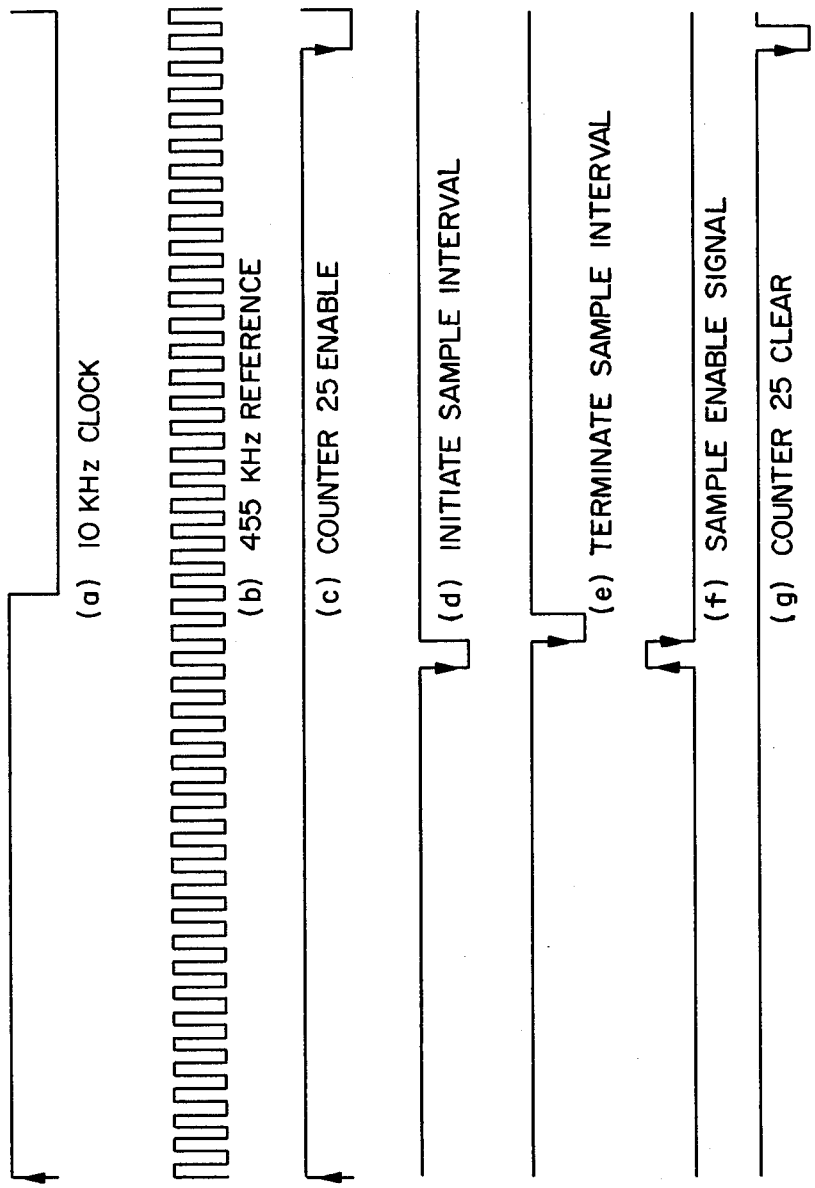
Figure 5:
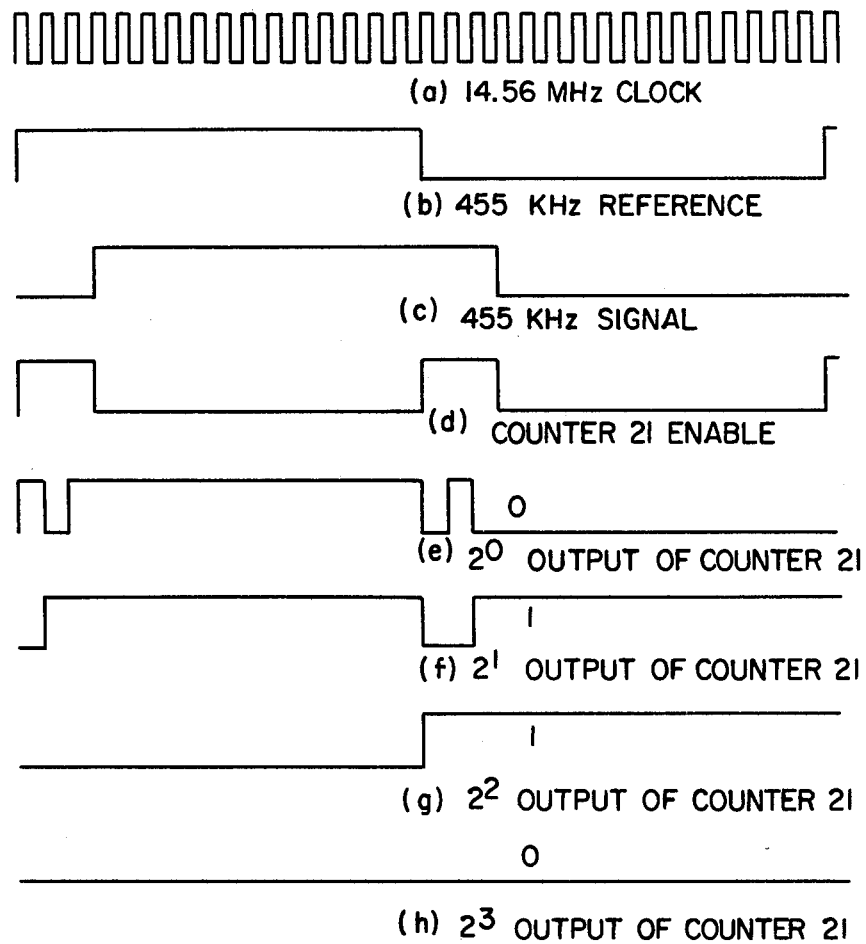

FIG. 1 is a schematic diagram of a transmitter encoder-modulator constructed according to the invention, FIG. 2 is a schematic diagram of a receiver digital phase demodulator constructed according to the invention, FIG. 3 is a schematic diagram of a receiver decoder and decision logic constructed according to the invention, FIG. 4 shows the control signals during one-bit period, and FIG. 5 shows the control and output signals during one sampling interval.

DESCRIPTION OF THE INVENTION

Referring to the drawings, a novel communications system constructed according to the invention is shown therein. Source data are transformed into a sequence of binary digits which, as shown in FIG. 1, are then shifted one bit at a time into a four-bit shift register to form a sequence of channel symbols. Channel symbols are thus formed from a binary sequence by partitioning that sequence as illustrated in Table V A. Successive symbols in the resulting sequences consist of three bits from the previous symbol and one new bit. Although consecutive symbols are not statistically independent, the digits in the input binary sequence are statistically independent and the channel symbol sequence is modeled by a finite Markov chain. The channel symbol in the shift register is the address of a channel signal which is selected for transmission by a data selector/multiplexer 2. Consequently, the channel signal sequence is also modeled by the same finite Markov chain. The bandwidth of the signal sequence is a function of the order in which channel signals are transmitted. This, in turn, is a function of the channel symbol-signal correspondence table embodied by connections between the set of signals and the multiplexer data input terminals. The potential for intersymbol interference is minimized if the symbol-signal correspondence table is one for which the spectral width of the signal sequence is minimum. If the transmitted signal sequence is not greatly distorted by the communications channel, the received signal sequence and the input channel symbol are both modeled by the same finite Markov chain. Because a binary digit appears in four consecutive channel symbols, its value, "one" or "zero," can be deduced at the receiver terminal from four consecutive estimates of channel symbols which are based upon four consecutive quantizations of the signal received.

Table V shows the channel symbol-signal correspondence embodied in FIG. 1. The members of the set of channel symbols, in binary form, are arranged in their natural order. The members of the set of channel signals are arranged in one-to-one correspondence with the channel symbols and are identified by their relative phase delay. The channel signals are also identified by signal state index which is assigned in natural order of phase delay. The correspondence table in Table V is one of the eight (H in Table IV) which were found to offer minimum mean squared channel error when the digits of the binary sequence from which channel symbols are formed are statistically independent.

The transmitter-encoder modulator shown in FIG. 1 generates a stable reference signal which is phase modulated in discrete steps to provide 16 signals of different phase each of which corresponds uniquely to one of 16 channel symbols. In the present arrangement the reference signal has a frequency of 455 kHz which is phase displaced through 16 equally spaced phase states from 0 deg to 168.75 deg in 11.25 deg steps.

A crystal controlled oscillator 3 generates a signal having a frequency of 14.56 MHz which is counted down, that is divided by 32 by a circuit 5 using one-half of a dual edge triggered D flip-flop and a fully synchronous four bit counter to generate a reference signal having a frequency of 455 kHz.

To provide 16 equally spaced phase states of the 455 kHz signal the output of the "divide by 32" circuit 5 is fed into a 16 bit shift register 6 comprised of eight dual D flip-flops 7 and is clocked through the register by the 14.56 MHz oscillator 3 causing the leading edge of a cycle of the 455 kHz signal to progress through the register 6 at a rate of one bit (flip-flop) per 0.0687 $\mu$s.

The 16 signals at the outputs $a$ to $r$ of flip-flops 7 are applied to the inputs $a'$ to $r'$ of 16-lines to 1-line data selector/multiplexer 2 which selects as its output one of the 16 inputs in response to a four bit address. Each of the signals is connected to a particular data input terminal of the data selector/multiplexer so that, given any of the channel symbols of Table V as address, the corresponding channel signal appears at the data selector/multiplexer output terminal 9.

A serial data bit sequence is shifted one bit at a time into four-bit shift register 1 at a data rate of 10 kHz by a data clock signal whose waveform is shown in FIG. 4a. Each channel symbol in the register is thus formed of the four most recent digits in the serial bit sequence, three of which appeared in the previous word. The parallel outputs of the shift register address the data selector/multiplexor 2 to provide at its output 9 a sequence of 455 kHz phase shifted signals corresponding to the sequence of channel symbols in shift register 1.

The output 9 of the data selector/multiplexor 2 is connected to a bandpass filter 11 which suppresses the second and higher harmonics of the phase modulated 455 kHz digital signal. The filter output is then transmitted by known means over a communications channel to a receiver terminal shown in FIG. 2 where the frequency of the received signal is restored to 455 kHz. The received signal is band-pass filtered by a filter 12 to suppress adjacent band and other unwanted or potentially interfering signals. In order to prepare the received signal for further processing, a voltage controlled oscillator is phase locked to the received signal by a phase locked loop 13. The phase modulation of the received signal is thus impressed on the 455 kHz digital signal from the voltage controlled oscillator shown in FIG. 2.

In order to identify the relative phase of each channel signal in the sequence transmitted, it is necessary to establish at the receiving terminal of the communications channel both a reference of phase and a measure of time between successive channel signals. The 455 kHz phase reference signal is derived from a 14.56 MHz receiver clock oscillator by a "divide by 32" circuit similar to that shown in FIG. 1. The phase of the 455 kHz reference is adjusted during a preamble to the data transmitted. The preamble consists of a short sequence of binary digits which is transformed first to a sequence of channel symbols and then to a sequence of channel signals as described above. The preamble transmitted is known at the receiver and may be used to effect necessary receiver modem adjustments. For example, if the preamble includes a sequence of "zero" binary digits, then these will be transformed to a sequence of identical channel symbols: 0000. According to Table V, a sequence of zero phase signals will be transmitted. At this time, the phase of the 455 kHz receiver reference is adjusted to coincide with the phase of the signal received. Once this is accomplished, the phase of the locally generated 10 kHz receiver clock is adjusted for most accurate decoding of another short preamble sequence designed for this purpose.

The receiver digital phase demodulator in FIG. 2 includes a phase detector and sampling circuit. The phase detector circuit consists of an exclusive-OR circuit 17, a D flip-flop 19 and three synchronous four-bit binary counters 21. The phase modulated 455 kHz signal shown in FIG. 5c from phase locked loop 13 is compared to a 455 kHz stable reference voltage shown in FIG. 5b by applying both inputs to exclusive-OR circuit 17. The exclusive-OR output is high when the input signals are different. The output then is a series of pulses, two per period of the 455 kHz signal as shown in FIG. 5d, whenever a phase difference exists between the received signal and the reference. These pulses, whose width is directly proportional to the phase difference, enable a 12-bit binary counter comprising the three binary counters 21 which are clocked by a 14.56 MHz clock voltage shown in FIG. 5a. D flip-flop 19 clocked at the same rate is connected between exclusive-OR circuit 17 and binary counters 21 so that the enable pulse widths are integral multiples of the clock period for proper operation of the counter.

At the end of $2^K$ cycles of the 455 kHz signal the output of the counter is $2^K \times \phi$, where $\phi$ is the signal state index. For example, assume a signal state index $\phi = 3(33.75°)$ and $K = 4$. The counter output is $2^4 \times 3 =$ 48, which is expressed in binary notation as 000000110000. Since division by 2 in binary means shifting the decimal to the left by one place, the signal state index is directly obtained from the above by shifting the decimal to the left by four places giving the binary index as 00000011.0000 = 3.

The sampling interval is controlled by the 10 kHz data clock signal shown in FIG. 4a. The data clock signal enables a flip-flop 23 which in turn enables two counters 25 cascaded to form an eight-bit counter which is clocked by the 455 kHz reference signal. Each counter is connected to two digital comparators 27 which are connected in pairs to two four-input NAND gates 29. The outputs of the NAND gates are connected to a flip-flop 31 having its output connected to an "enable" terminal of one counter 21. When the output count from counters 25 attains the smallest number programmed by the position of toggle switches 33 connected to one pair of digital comparators 27, the sampling interval is initiated.

This sampling control continues to count cycles of the reference signal and ends the sampling period when the count reaches a second, larger number programmed by toggle switches 33 connected to the other pair of digital comparators 27. The signal state index counters 21 are disabled and the appropriate outputs are decoded to determine the symbol transmitted.

The control counters 25 continue to count until 44 cycles of the phase reference have occurred. At this time a control signal (sample command) is generated by a three-input NAND gate 35 which shifts the decoded word into storage registers 61, 62, 63 and 64 shown in FIG. 3, clears all counters 21 and 25, and disables the receiver phase period.

FIG. 4 shows representative timing waveforms and the 455 kHz phase reference signal. The arrows on the waveforms indicate the transitions which define a new system state. This figure shows the sampling interval initiated by a count of 21 cycles of 455 kHz reference and terminated by a count of 22 cycles. The corresponding toggle switch programming of input signals to comparators 27 is shown in FIG. 2. The rising transition of data clock signal 4a sets flip-flop 23 whose output is shown as waveform 4c. When a pre-programmed number of cycles of 455 kHz reference 4b are counted, a negative going transition in waveform 4d from one NAND gate 29 sets enable flip-flop 31 enabling the signal state index counter 21. The enable signal represented by waveform 4f remains high until the reference counters 25 reach the second programmed value. The falling transition of waveform 4e generated by the other NAND gate 29 signals this event and clears the enable flip-flop 31 of signal state index counters 21. After 44 cycles of the reference have occurred, the negative going transition of waveform 4g disables and clears control counters 25 in readiness for the next positive going transition of data clock signal 4a.

Phase measurements are made each cycle of the 10 kHz data clock 4a when the sample enable signal 4f is high. The phase measurement is made by counting cycles of the 14.56 MHz clock when the 455 kHz reference and the 455 kHz signals, reformed by the phase locked loop 13, are different. Representative waveforms are shown in FIG. 5. Waveform 5a is the 14.56 MHz clock signal. Waveforms 5b and 5c represent one cycle of the 455 kHz reference and phase modulated signals, respectively. In the figure, these signals differ in phase by 33.75 deg corresponding to signal state index 3. The output of the exclusive-OR phase detector 17 shown in waveform 5d, enable the signal state index counter 21 for a total of six cycles of the 14.56 MHz clock. The output of the counter is shown by waveforms 5e, 5f, 5g and 5h. Since in this example the phase measurement was made during only one cycle of the 455 kHz reference ($K = 1$), the output of the phase counter is given by $2 \times 3 = 0110$ in binary notation. Division by two gives the correct signal state index. Division by an integral power of two is effected by the position of a 4-pole, 6 position rotary switch 37 shown in FIG. 2. The signal state index as determined from phase measurements is the binary number corresponding to signals WXYZ.

An appropriate channel symbol is assigned, in accordance with Table I, to signal state index WXYZ by NAND gates 39 to 59 as shown in FIG. 3. Signals W, X, Y and Z together with their inverse $\overline{W}$, $\overline{X}$, $\overline{Y}$ and $\overline{Z}$ (complement) are applied to the inputs of the NAND gates 39 to 55 connected for code-to-code conversion from signal state index to channel symbol. The results are stored in storage registers 61 to 64. The outputs of NAND gates 56 to 59, representing the channel symbol of the signal received during a data clock period, are shifted into first storage register 61 by a sample command pulse from NAND gate 35 in FIG. 2 after 44 cycles of the 455 kHz phase reference have been counted during a data clock period as described above. At the same time, the contents of the first storage register 61 are parallel shifted into second storage register 62, the contents of the second register are parallel shifted into third storage register 63 and the contents of the third register are parallel shifted into fourth storage register 64.

A value is assigned by a "voting" circuit or bit weighting circuit 65, including NAND gates 67 to 70, to the only binary digit common to the four channel symbols stored in the four storage registers 56 to 59 and is clocked into a D flip-flop 71 by the sample command signal from NAND gate 35 in FIG. 2. The channel symbols stored in the four 4-bit storage registers 61 to 64 are effectively arranged in a column forming a 4 × 4 matrix of their elements. The diagonal elements, those which are input to the bit weighting circuit, represent four consecutive estimates of the value of a single bit. The output of the bit weighting circuit is the weighted average of diagonal bits in the storage registers.

As estimate of bit value is made near the end of each data clock period under control of the sample command signal. The resulting sequence of binary digits images the input data sequence at the transmitter encoder modulator.

A list of the type numbers and manufacturers of the components shown in the drawings are given in Table VI.

While four bits have been selected for each word and the number of words is 16 with 16 corresponding phases for modulating a carrier, it should be understood that this number is selected to demonstrate the invention and that any other convenient number may be used.

A communication system using a novel signal system utilizes available bandwidth more efficiently than communication systems heretofore and transmits messages more accurately than present day systems.

Table I

| Symbol | Signal Index | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 1111 | 1  | x | x |   |   |   |   |   |   |   |   |    |    |    |    |    |    |
| 1110 | 2  |   |   | x | x |   |   |   |   |   |   |    |    |    |    |    |    |
| 1101 | 3  |   |   |   |   | x | x |   |   |   |   |    |    |    |    |    |    |
| 1100 | 4  |   |   |   |   |   |   | x | x |   |   |    |    |    |    |    |    |
| 1011 | 5  |   |   |   |   |   |   |   |   | x | x |    |    |    |    |    |    |
| 1010 | 6  |   |   |   |   |   |   |   |   |   |   | x  | x  |    |    |    |    |
| 1001 | 7  |   |   |   |   |   |   |   |   |   |   |    |    | x  | x  |    |    |
| 1000 | 8  |   |   |   |   |   |   |   |   |   |   |    |    |    |    | x  | x  |
| 0111 | 9  | x | x |   |   |   |   |   |   |   |   |    |    |    |    |    |    |
| 0110 | 10 |   |   | x | x |   |   |   |   |   |   |    |    |    |    |    |    |
| 0101 | 11 |   |   |   |   | x | x |   |   |   |   |    |    |    |    |    |    |
| 0100 | 12 |   |   |   |   |   |   | x | x |   |   |    |    |    |    |    |    |
| 0011 | 13 |   |   |   |   |   |   |   |   | x | x |    |    |    |    |    |    |
| 0010 | 14 |   |   |   |   |   |   |   |   |   |   | x  | x  |    |    |    |    |
| 0001 | 15 |   |   |   |   |   |   |   |   |   |   |    |    | x  | x  |    |    |
| 0000 | 16 |   |   |   |   |   |   |   |   |   |   |    |    |    |    | x  | x  |

Symbol-Signal Correspondence and Transition Matrix, Elements x = 0.5; all others are zero. Symbols and Signal Indexes are ordered monotonically.

Table II

| Channel Symbol | Decimal Equivalent | Signal State Index | Relative Signal Amplitude |
|---|---|---|---|
| 1111 | 15 | 1  | 1.0 |
| 1110 | 14 | 2  | $5.7 \times 10^{-1}$ |
| 1101 | 13 | 3  | $4.1 \times 10^{-1}$ |
| 1100 | 12 | 4  | $-4.3 \times 10^{-9}$ |
| 1011 | 11 | 5  | $4.1 \times 10^{-1}$ |
| 1010 | 10 | 6  | $-1.8 \times 10^{-9}$ |
| 1001 | 9  | 7  | $-1.5 \times 10^{-1}$ |
| 1000 | 8  | 8  | $-5.7 \times 10^{-1}$ |
| 0111 | 7  | 9  | $5.7 \times 10^{-1}$ |
| 0110 | 6  | 10 | $1.5 \times 10^{-1}$ |
| 0101 | 5  | 11 | $1.8 \times 10^{-9}$ |
| 0100 | 4  | 12 | $-4.1 \times 10^{-1}$ |
| 0011 | 3  | 13 | $4.3 \times 10^{-9}$ |
| 0010 | 2  | 14 | $-4.1 \times 10^{-1}$ |
| 0001 | 1  | 15 | $-5.7 \times 10^{-1}$ |
| 0000 | 0  | 16 | $-1.0$ |

Relative Signal Amplitudes for Least Mean Squared Channel Error for 4-bit Channel Symbol Set. Assumed Cut-off Frequency is One-Fifth the Bit Rate

Table III

| A | B | C | D | E | F |
|---|---|---|---|---|---|
| 1111 | 1111 | 1111 | 1111 | 1111 | 1111 |
| 0111 | 1110 | 0111 | 0111 | 1110 | 0110 |
| 1110 | 0111 | 1110 | 1110 | 0111 | 1110 |
| 1011 | 1101 | 1011 | 1101 | 1011 | 1011 |
| 1101 | 1011 | 1101 | 1011 | 1101 | 1101 |
| 0110 | 0110 | 0110 | 0110 | 0110 | 0110 |
| 0011 | 1100 | 0011 | 0011 | 0011 | 0101 |
| 0101 | 1010 | 1010 | 0101 | 0101 | 0011 |
| 1010 | 0101 | 0101 | 1010 | 1010 | 1100 |
| 1100 | 0011 | 1100 | 1100 | 1100 | 1010 |
| 1001 | 1001 | 1001 | 1001 | 1001 | 1001 |
| 0010 | 0100 | 0010 | 0100 | 0010 | 0010 |
| 0100 | 0010 | 0100 | 0010 | 0100 | 0100 |
| 0001 | 1000 | 0001 | 0001 | 1000 | 0001 |
| 1000 | 0001 | 1000 | 1000 | 0001 | 1000 |
| 0000 | 0000 | 0000 | 0000 | 0000 | 0000 |

(a) Ordered 4-Bit Channel Symbol Sets

| Cut-off Ratio $\omega_c T/2\pi$ | A | B | C | D | E | F |
|---|---|---|---|---|---|---|
| 0.10 | 0.243 | 0.243 | 0.243 | 0.243 | 0.243 | 0.244 |
| 0.15 | 0.136 | 0.136 | 0.136 | 0.136 | 0.137 | 0.137 |
| 0.20 | 0.068 | 0.068 | 0.069 | 0.069 | 0.070 | 0.071 |
| 0.25 | 0.052 | 0.052 | 0.053 | 0.054 | 0.055 | 0.055 |
| 0.30 | 0.042 | 0.042 | 0.043 | 0.045 | 0.045 | 0.046 |
| 0.35 | 0.037 | 0.037 | 0.038 | 0.040 | 0.040 | 0.041 |
| 0.40 | 0.034 | 0.034 | 0.034 | 0.036 | 0.036 | 0.037 |
| 0.45 | 0.031 | 0.031 | 0.032 | 0.033 | 0.033 | 0.034 |
| 0.50 | 0.030 | 0.030 | 0.031 | 0.031 | 0.032 | 0.032 |

(b) Mean Squared Error for Phase Modulation, $\Delta\theta = 11.25$, in Units of Transmitted Signal Strength.
Mean Squared Channel Error for Serveral Channel Symbol Sets in Monotonic Order of Signal State.

Table IV

| A | B | C | D | E | F | G | H |
|---|---|---|---|---|---|---|---|
| 1111 | 1111 | 1111 | 1111 | 0000 | 0000 | 0000 | 0000 |
| 1110 | 0111 | 1110 | 0111 | 0001 | 1000 | 0001 | 1000 |
| 0111 | 1110 | 0111 | 1110 | 1000 | 0001 | 1000 | 0001 |
| 1101 | 1101 | 1011 | 1011 | 0010 | 0010 | 0100 | 0100 |
| 1011 | 1011 | 1101 | 1101 | 0100 | 0100 | 0010 | 0010 |
| 0110 | 0110 | 0110 | 0110 | 1001 | 1001 | 1001 | 1001 |
| 0011 | 0011 | 0011 | 0011 | 1100 | 1100 | 1100 | 1100 |
| 0101 | 0101 | 0101 | 0101 | 1010 | 1010 | 1010 | 1010 |
| 1010 | 1010 | 1010 | 1010 | 0101 | 0101 | 0101 | 0101 |
| 1100 | 1100 | 1100 | 1100 | 0011 | 0011 | 0011 | 0011 |
| 1001 | 1001 | 1001 | 1001 | 0110 | 0110 | 0110 | 0110 |
| 0100 | 0100 | 0010 | 0010 | 1011 | 1011 | 1101 | 1101 |
| 0010 | 0010 | 0100 | 0100 | 1101 | 1101 | 1011 | 1011 |
| 1000 | 0001 | 1000 | 0001 | 0111 | 1110 | 0111 | 1110 |
| 0001 | 1000 | 0001 | 1000 | 1110 | 0111 | 1110 | 0111 |
| 0000 | 0000 | 0000 | 0000 | 1111 | 1111 | 1111 | 1111 |

Channel symbol-signal correspondence tables for which mean squared channel error is minimum, Symbols are in monotonic order of corresponding signals.

Table V

```
1 1 0 0 1 0 1 1 0 0   Input data
1 1 0 0                 sequence
  1 0 0 1
    0 0 1 0
      0 1 0 1            Channel Symbols
        1 0 1 1
          0 1 1 0
            1 1 0 0
              1 0 0 0
```
a

| Channel Symbol | Signal State Index | Degrees of Phase Shift |
|---|---|---|
| 0000 | 0  | 0.00 |
| 0001 | 2  | 22.50 |
| 0010 | 4  | 45.00 |
| 0011 | 9  | 101.25 |
| 0100 | 3  | 33.75 |
| 0101 | 8  | 90.00 |
| 0110 | 10 | 112.50 |
| 0111 | 14 | 157.50 |
| 1000 | 1  | 11.25 |
| 1001 | 5  | 56.25 |
| 1010 | 7  | 78.75 |
| 1011 | 12 | 135.00 |
| 1100 | 6  | 67.50 |
| 1101 | 11 | 123.75 |
| 1110 | 13 | 146.25 |
| 1111 | 15 | 168.75 | b

Derivation of Channel Symbols from the Input Binary Data Sequence and a Channel Symbol-Signal Correspondence Table for which mean squared channel error is minimum Table VI

| Reference Number | Device | Type No. | Manufacturer |
|---|---|---|---|
| 1 | Four Bit Shift Register | SN7495N | Texas Instruments |
| 2 | 16 lines to 1 line data selector multiplexor | SN74150N | Texas Instruments |
| 5 | Divide by 32 Circuit | SN7474N SN74163N | Texas Instruments |
| 7 13 | Dual D Flip-Flops Phase Locked Loop | SN7474N NE562B | Texas Instruments Signetics Inc. |
| 21 | Signal State Index Counter | SN74161N | Texas Instruments |
| 25 | Reference Counter | SN74163N | Texas Instruments |
| 27 | Digital Comparators | DM8200 | National Semiconductor Corp. |
| 61 to 64 | Storage Registers | SN7495N | Texas Instruments |

What is claimed is:

1. A communication system comprising:
transmitter means, receiving digital input data from an external source for generating output signals having channel signal states corresponding to predetermined channel symbols, said transmitter means including means for generating channel symbols comprising "m" consecutive bits of said input data wherein each channel symbol is a unique combination of said "m" consecutive bits and wherein each sequentially generated channel symbol comprises "m-1" consecutive bits of the preceding channel symbol and the next bit in the bit sequence of said input data and further includes means for generating said corresponding channel signal states in response to said channel symbol, wherein said channel signal states are related in accordance with the simultaneous solution of a plurality of equations of the formula $$([M]^t + [M][X] = 0)$$

wherein
(1) $[X]$ is a $2^m \times 1$ matrix of signal states
(2) $[M]^t$ is the transpose of matrix $[M]$ and
(3) $[M] = ([T] - 2[T] + [T^2])$ $$\left[ \sum_{n=1}^{m} m[T]^{m-1} \left\{ 1 + \frac{2}{\pi} \left[ \frac{1 - \cos(n\omega_c T)}{n\omega_c T} - Si(n\omega_c T) \right] \right\} \right]$$

$$\sum_{n=1}^{m} n[T\pi^{n-1}] \left\{ 1 + \frac{2}{\pi} \left[ \frac{1 - \cos(n\omega_c T)}{n\omega_c t} - Si(n\omega_c T) \right] \right\}$$

wherein
$m$ is the number of bits in a channel symbol identifying each $2^m$ channel signal states
$\omega_c$ is the cutoff frequency of the baseband equivalent to the communication channel
$T$ is a data bit period
$[T]$ is a $2^m \times 2^m$ matrix of conditional probabilities of channel symbols and of channel signal states which correspond to these channel symbols
$[I]$ is a $2^m \times 2^m$ identity matrix, $[M]^o = [I]$ and
$Si(n\omega_c T)$ is the sine integral with argument $(n\omega_c T)$; and
receiver means for recreating said digital input data in response to said output signals, said receiver means including means for decoding said channel signal states to sequentially reproduce said channel symbols and means for recreating said input data from more than one of said sequentially generated channel symbols.

2. The communication system of claim 1 wherein said output signals are amplitude modulated, said means for generating channel signal states generates a plurality of channel signal states, each of said channel signal states having an amplitude indicative of one of said channel symbols.

3. The communication system of claim 1 wherein said output signals are phase modulated, said means for generating channel signal states generates a plurality of channel signal states each of said plurality of channel signal states having a phase indicative of one of said channel symbols.

4. The communication system of claim 1 wherein said output signal is frequency modulated, said means for generating channel signal states generates a plurality of channel signal states, each of said plurality of channel signal states having a frequency indicative of one of said channel symbols.

5. The communication system as described in claim 1 in which $m = 4$ and each set of four bit channel symbols A to H listed hereafter are ordered monotonically according to the corresponding signal states:

| A | B | C | D | E | F | G | H |
|---|---|---|---|---|---|---|---|
| 1111 | 1111 | 1111 | 1111 | 0000 | 0000 | 0000 | 0000 |
| 1110 | 0111 | 1110 | 0111 | 0001 | 1000 | 0001 | 1000 |
| 0111 | 1110 | 0111 | 1110 | 1000 | 0001 | 1000 | 0001 |
| 1101 | 1101 | 1011 | 1011 | 0010 | 0010 | 0100 | 0100 |
| 1011 | 1011 | 1101 | 1101 | 0100 | 0100 | 0010 | 0010 |
| 0110 | 0110 | 0110 | 0110 | 1001 | 1001 | 1001 | 1001 |
| 0011 | 0011 | 0011 | 0011 | 1100 | 1100 | 1100 | 1100 |
| 0101 | 0101 | 0101 | 0101 | 1010 | 1010 | 1010 | 1010 |
| 1010 | 1010 | 1010 | 1010 | 0101 | 0101 | 0101 | 0101 |
| 1100 | 1100 | 1100 | 1100 | 0011 | 0011 | 0011 | 0011 |
| 1001 | 1001 | 1001 | 1001 | 0110 | 0110 | 0110 | 0110 |
| 0100 | 0100 | 0010 | 0010 | 1011 | 1011 | 1101 | 1101 |
| 0010 | 0010 | 0100 | 0100 | 1101 | 1101 | 1011 | 1011 |
| 1000 | 0001 | 1000 | 0001 | 0111 | 1110 | 0111 | 1110 |
| 0001 | 1000 | 0001 | 1000 | 1110 | 0111 | 1110 | 0111 |
| 0000 | 0000 | 0000 | 0000 | 1111 | 1111 | 1111 | 1111 |

* * * * *

UNITED STATES PATENT AND TRADEMARK OFFICE
CERTIFICATE OF CORRECTION

PATENT NO. : 4,079,202
DATED : March 14, 1978
INVENTOR(S) : Delmar Virgil Payne

It is certified that error appears in the above-identified patent and that said Letters Patent are hereby corrected as shown below:

Column 1, line 65, delete "only a finite number of values of modulated" and insert ---is conditional on only the value of that---.

Column 3, line 67, insert the exponent "m" after the N=2---.

Column 9, line 35, after "receiver phase", insert---demodulator in readiness for the start of the next bit---.

Column 10, line 4, delete "enable" and insert---enables---.

Column 11, line 67, delete "serveral" and insert---several---.

Column 13, line 50, delete " " and insert ---] after the T in equation to read $n[T]^{n-1}$---.

Signed and Sealed this

Twenty-third Day of January 1979

[SEAL]

Attest:

RUTH C. MASON
Attesting Officer

DONALD W. BANNER
Commissioner of Patents and Trademarks